Jan. 1, 1935.                 J. H. DAVIS                 1,986,562
                            GARDEN ORNAMENT
                          Filed March 7, 1934
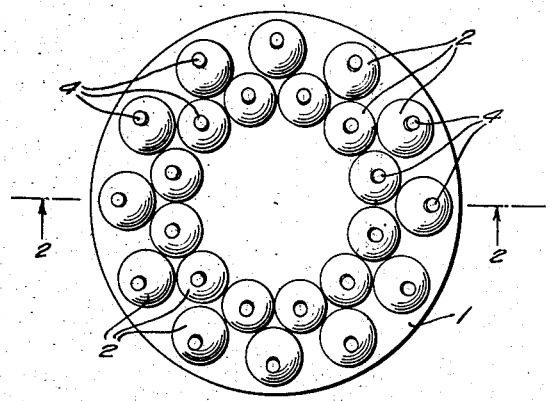
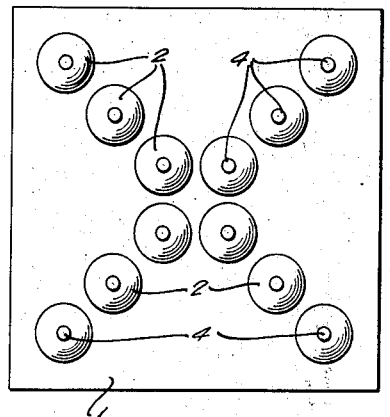
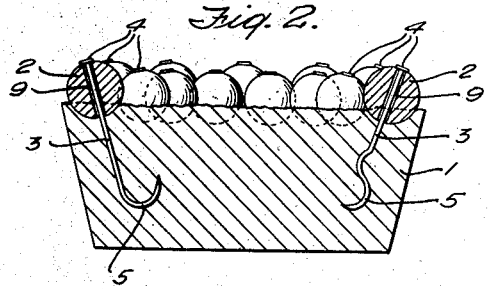
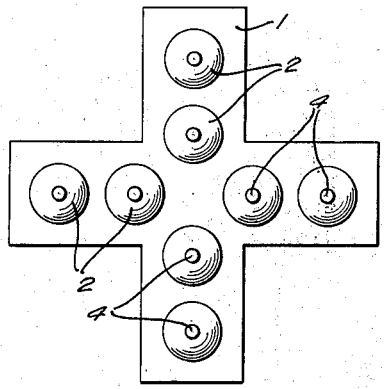
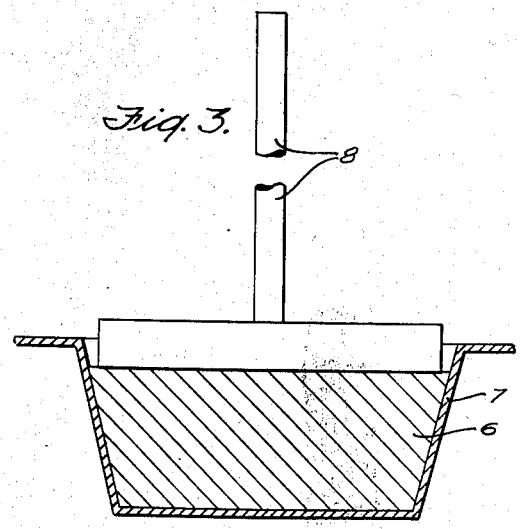
INVENTOR
JAMES H. DAVIS
BY
Blair Curtis + Dunne
his ATTORNEYS Patented Jan. 1, 1935

1,986,562

UNITED STATES PATENT OFFICE 1,986,562

GARDEN ORNAMENT

James H. Davis, South Beach, N. Y.

Application March 7, 1934, Serial No. 714,393

1 Claim. (Cl. 41—10)

The present invention relates to an improvement in garden ornaments or the like and methods of making the same. One object thereof has been to provide a garden ornament of simple and durable construction which may be conveniently employed to enhance the richness and variety of colors and textures in landscaping effects, garden displays and the like. A further object of my invention has been to provide a method whereby objects of the kind indicated may be conveniently and effectively made.

One embodiment of my invention, in so far as it involves said method and an article of manufacture for the purpose specified, is illustrated in the drawing accompanying this specification and in which—

Figure 1 is a top plan view of a garden ornament;

Figure 2, a vertical section on the line 2—2 of Figure 1;

Figure 3, a diagrammatic view illustrating apparatus for forming the base member of said garden ornament and a step in the method of making the same; and Figures 4 and 5, top plan views of garden ornaments of different shape.

Referring to the drawing, my improved article of manufacture comprises the base member 1, preferably made of hardened plastic material such as concrete, a phenol condensation product such as "bakelite", or other suitably resistant material which may be cast or molded. A plurality of ornamental objects as varied colored beads 2, or the equivalent, are partly embedded in base 1 and secured in ornamental arrangement thereon by means of anchoring members 3, here shown as pins each having a head 4 and a bent portion 5 which serves as a shear resisting element to retain the pin securely in operative position.

It is contemplated that garden ornaments according to my invention may be made in a wide variety of shapes, forms and sizes to meet the widely varying conditions of use and that the material of manufacture may also be varied to produce different effects in utility or appearance.

One method of making a garden ornament according to my invention includes the steps of placing a quantity or mass of concrete mix 6 in a mold 7 of suitable size and shape. The plastic mass is then tamped by any suitable impact or pressure device as a hand operated tamp 8 to compact the solid particles thereof. Before the mix begins to set, the bent ends of the anchoring devices are pushed through the upper surface into the compacted mass where they become securely embedded. The beads themselves are also pressed in sufficiently to be partly embedded when the mass sets. Where pins 3 are used as the anchoring means, the ornamental or decorative objects secured thereby may be varied colored beads or the like each provided with a passageway 9 for engaging the shank of the pin. A head 4 acts as a stop member to prevent the bead from becoming detached from the pin or anchor member 3. After the beads have been threaded upon the pins 3, the disengaged end portions of the pins are bent as at 5 to provide shear resisting deformations therein. With the deformed ends of the pins 3 pushed into the compacted mass 6, the beads are held in any desired decorative or ornamental arrangement until the concrete or other plastic mass finally sets.

Figure 4 illustrates a garden ornament of square shape and figure 5 an ornament in the shape of a cross with the beads in each case arranged in symmetrical fashion and extending above the top surface of the respective bases.

One manner of using garden ornaments as above described consists in setting them in the ground with the top surfaces exposed. When so employed in rock gardens or formal garden arrangements, they provide durable and effective means for producing certain controlled color effects and textures which add materially to the pleasing appearance of the natural objects associated therewith.

I claim—

A garden ornament or the like, comprising a base of a hardened plastic material, a plurality of bead like objects partly embedded in the top surface of said base and each provided with a passageway through it, and an anchoring device extending through each of said passageways and partially embedded in the base, each of said anchoring devices having an exposed bead retaining end portion and an embedded shear resisting portion.

JAMES H. DAVIS.